June 4, 1957  C. D. DOSKER  2,794,458
HIGH SPEED SAW
Filed Dec. 18, 1952
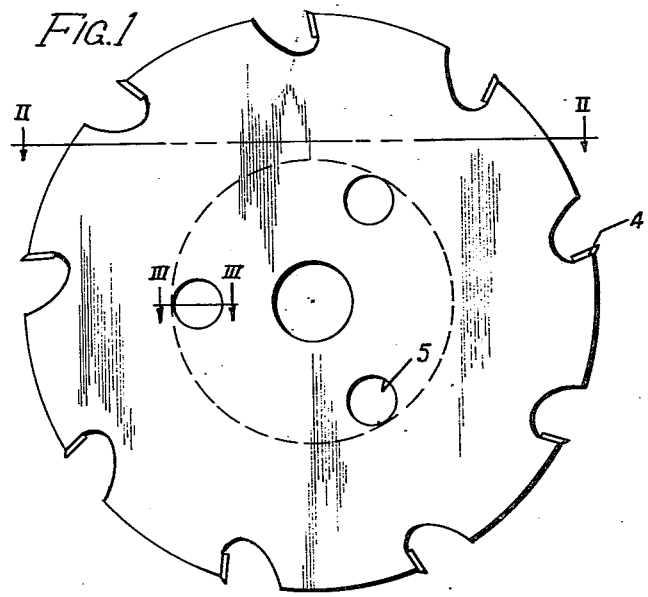
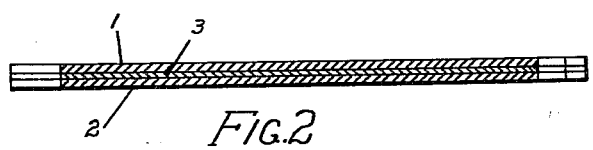
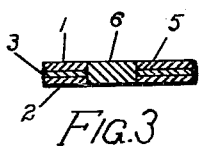
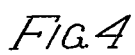
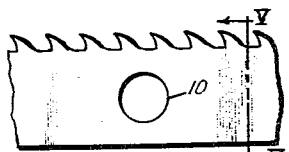
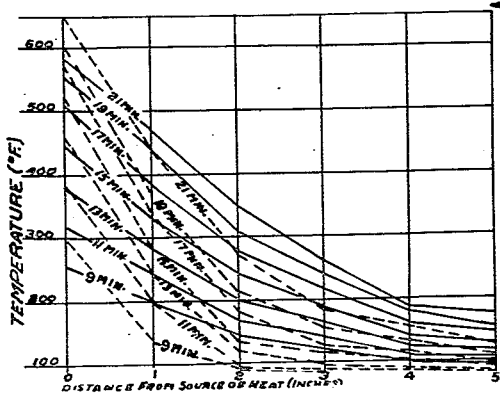
INVENTOR.
CORNELIUS D. DOSKER
BY *Arthur Robert*
ATTORNEY

United States Patent Office 2,794,458
Patented June 4, 1957

2,794,458

HIGH SPEED SAW

Cornelius D. Dosker, Louisville, Ky.

Application December 18, 1952, Serial No. 326,620

2 Claims. (Cl. 143—133)

This invention relates to saws for cutting lumber or similar materials and relates in particular to saws adapted for high-speed operation.

In the sawing of lumber or other materials with circular or band saws, the heat developed at the cutting or tooth edge has placed limitations on the thickness of the blade and the speed at which saws may be safely operated. In operation, the peripheral or toothed portion of a circular saw is heated more than the center portion, and in band saws, the lead or toothed edge is heated more than the center and back portions of the blades. This results in unequal expansion in both circular and band saws, and causes a warping of the disc or blade.

Heretofore, to overcome this difficulty caused by unequal heating in the operation of both circular and band saws, the blades generally have been placed in unequal tension before use. This was done to circular saws by hammering the blade in an area behind the cutting edge in order that the rim or edge may be placed in tension. This tension becomes relieved as the rim of the saw heats and expands in operation. However, it is very difficult to so tension a circular saw blade that it will run in perfect plane without weaving during operation. To compensate for unequal heating in band saws, the saws are rolled and tensioned by stretching the back edge of the blade so that the heat generated by the cutting edge will bring both the toothed or leading edge and the back edge of the saw under equal strain or tension.

These operations of tensioning saw blades must be done by highly skilled workmen at the factory or at the sawmill, and the results obtained are subject to great variation because of the human factor involved.

It is an object of the present invention to provide a saw blade in which the heat generated at the toothed edge is rapidly transmitted to the rest of the blade so as to eliminate unequal stressing of the blade that would produce warpage.

A further object is the provision of a saw blade of the circular type wherein heat may be rapidly transmitted from the blade to the saw mandrel to be dissipated.

A further object is the provision of a high-speed band saw blade wherein heat expansion forces are substantially counteracted by transmission of heat to the surface of the drive wheels, thus preventing warpage.

A further object of the present invention is to provide a high-speed saw blade wherein heat expansion forces are substantially counteracted to prevent warping, thus reducing materially the width or clearance of the cutting edge of the tooth, thereby saving much material by making possible the use of thinner blades and thinner cutting clearances.

In accordance with the present invention, I provide a saw blade comprising outer laminations of suitable saw steel, integrally secured to an inner layer of metal having greater heat conductivity than steel. Preferably, the inner layer is of copper suitably brazed to steel, and, if desired, plugs of a similar heat conducting material may be inserted in the blade to assist in carrying the heat to the mandrel or other bearing member in contact with the blade.

The invention will be described in greater detail in the following specification taken in connection with the accompanying drawing illustrating preferred embodiments of the invention by way of example, and wherein:

Figure 1 is a side elevation of a circular saw embodying the invention;

Figure 2 is a section taken on line II—II of Figure 1;

Figure 3 is a section taken on line III—III of Figure 1;

Figure 4 shows a fragment of a band saw embodying the invention;

Figure 5 is a section taken on line V—V of Figure 4; and

Figure 6 is a heat conductivity diagram.

Referring to the drawing, the circular saw comprises thin outer steel laminations 1 and 2, having an interposed layer of copper 3 integrally secured thereto, as by brazing. If desired, each steel disc or lamination 1 and 2 may be electroplated on one or both sides with copper and the inner faces of these laminations may be fused throughout or only along the area in which the teeth are formed. Such fusion may be accomplished by electric brazing or in any other suitable well known manner. The copper layer is coextensive with the steel layers and portions, corresponding to the teeth recesses, are cut out when such recesses are formed. Thereupon, the cutting edges or tips 4 of the teeth are secured by silver soldering or brazing. These tips 4 are composed of high speed steel, or tungsten carbide or other suitably hard materials capable of withstanding high operating temperatures. If desired, holes 5 are formed in the saw and plugs 6 of copper are inserted in these holes and brazed in place. These plugs are so located that they are engaged by the saw clamping plates or collars, indicated in dot and dash lines in Figure 1. The plugs 6 facilitate the conduction of heat away from the saw to the mandrel.

In operation, as heat is developed at the saw teeth, the copper layer carries the heat rapidly to the more central parts of the saw disc so that the heat differential is maintained low and the blade does not tend to warp. This action also produces cooler teeth because the heat is rapidly conducted away from the teeth.

Copper has a conductivity approximately ten times that of steel and is preferably employed as the inner layer, but it will be understood any other highly conductive metal may be employed. Such metals are indicated in tables of conductivity in standard handbooks.

In the modification shown in Figure 4, a band saw comprising outer band 7 and 8 with a coextensive layer 9 of copper therebetween is shown. If desired, plugs 10 of copper may be inserted at intervals to transmit heat to the pulleys over which the band saw operates.

The diagrams in Figure 6 show the effect of a highly conductive insert. These curves are based on data derived from heating one end of a single strip of saw steel in one case and a composite strip of steel and copper in the other case, the composite strip having the same overall thickness as the single strip and being composed of outer layers of steel and an interposed layer of copper fused to the steel layers.

In developing the dotted line curves, the single steel strip was heated at one end. At the end of 9 minutes, its temperature was measured at the hot end and at points spaced 1, 2, 3, 4 and 5 inches from the hot end and these measurements were plotted to produce the 9 minute dotted line curve. The other dotted line curves were plotted from the temperature measurements made at the end of 11, 15, 17, 19 and 21 minutes.

The full line curves were plotted from similar measurements on the composite strip.

Thus it will be seen that in 19 minutes, for example, the temperature at the hot end of the single strip was about 600° while that of the more conductive composite strip was about 540°. The temperature gradient of the same curve for the single strip is much steeper than that of the composite strip. Thus the 19 minute dotted line curve for the single strip temperature falls from 600° at the hot end to about 370° at the 1 inch position while the corresponding full line curve for the highly conductive composite strip correspondingly falls from about 540° to 430° F.

I claim as my invention:

1. A high speed saw comprising: outer layers of steel integrally bonded to a middle layer of copper.

2. A saw, as specified in claim 1, having plugs of copper extending through the layers in position to have surface engagement with the means by which the saw is mounted on a drive shaft.

References Cited in the file of this patent

UNITED STATES PATENTS

| | | |
|---|---|---|
| 907,168 | Neill | Dec. 22, 1908 |
| 2,252,893 | Macklin | Aug. 19, 1941 |
| 2,365,965 | Littman | Dec. 26, 1944 |
| 2,624,381 | Von der Werth | Jan. 6, 1953 |

FOREIGN PATENTS

| | | |
|---|---|---|
| 771,382 | France | July 23, 1934 |